Feb. 22, 1966  R. J. CARVER  3,236,709
TIRE RECAPPING PROCESS
Filed Oct. 4, 1962  2 Sheets-Sheet 1
Fig.1.
Fig.2.
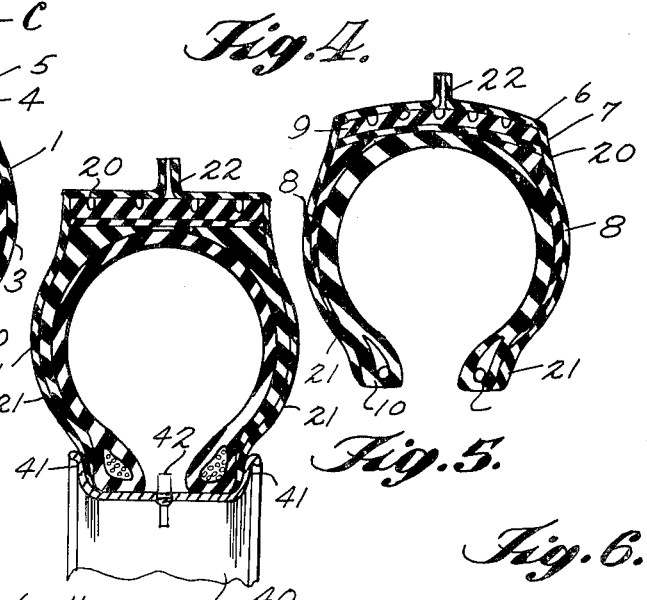
Fig.4.
Fig.5.
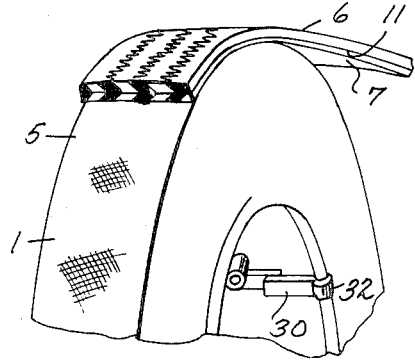
Fig.3.
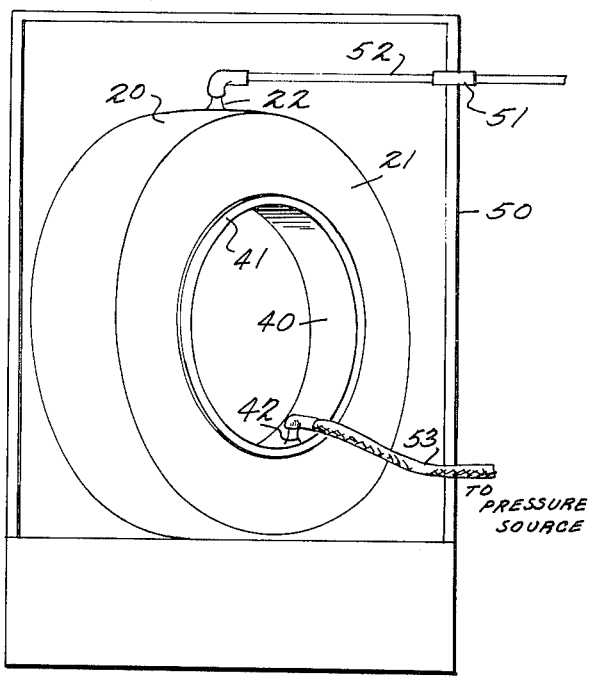
Fig.6.
INVENTOR.
ROY JAMES CARVER
BY
Cushman, Darby & Cushman
ATTORNEYS Feb. 22, 1966  R. J. CARVER  3,236,709
TIRE RECAPPING PROCESS
Filed Oct. 4, 1962  2 Sheets-Sheet 2

INVENTOR.
ROY JAMES CARVER
BY
Cushman, Darby & Cushman
ATTORNEYS

United States Patent Office 3,236,709
Patented Feb. 22, 1966

3,236,709
TIRE RECAPPING PROCESS
Roy James Carver, Muscatine, Iowa, assignor to Bandag Incorporated, Muscatine, Iowa, a corporation of Iowa
Filed Oct. 4, 1962, Ser. No. 228,500
8 Claims. (Cl. 156—96)

This invention relates generally to an improved method for retreading the running surface of vehicle tires and more particularly to a novel method for applying a prevulcanized tread strip directly to a tire casing by cold vulcanization for the purpose of replacing such tread as may have been previously worn off in use or otherwise removed from the tire.

Heretofore, various methods have been employed for retreading vehicle tires. Commonly, worn tires are recapped by the warm vulcanization method, wherein an uncured tread cover or "camel-back" is applied to the buffed crown surface of the previously cured tire casing or carcass and the assembly is vulcanized at an elevated temperature in a suitable mold. A major disadvantage of this type of retread resides in the finished or vulcanized tread surface which is relatively microporous and will quickly wear off in use thereby materially reducing the service-life of the retreaded tire. This is primarily due to the fact that the uncured "camel-back" cannot be subjected to an extremely high molding pressure while being vulcanized to the tire casing, without permanently deforming or distorting the casing. Any deformation or distortion of the tire casing during the curing operation will tend to subsequently rupture or materially weaken the vulcanized bond between the cured "camelback" and the crown surface of the tire after it is removed from the vulcanizing mold. In addition, the elevated vulcanizing temperature tends to weaken and deteriorate the previously cured tire casing.

More recently, attempts have been made to apply a prevulcanized tread strip to a previously cured tire casing by "cold" vulcanization. The prevulcanized tread strip is bonded directly to the tire casing by means of a bonding material without subjecting the tire casing to an elevated vulcanizing temperature which would tend to weaken and deteriorate the previously cured tire casing. In addition, since the tread strip is vulcanized before being applied to the tire casing, considerably increased vulcanization pressures may be employed which result in a tread surface having improved strength and density and which will tend to resist normal road abrasion. A retread having such a prevulcanized tread strip uniformly and securely bonded thereto will accordingly have a greatly increased service-life. However, in the past, efforts to bond a prevulcanized strip to a tire casing have met with limited success and generally resulted in relatively weak bonds and the use of relatively expensive, cumbersome methods and equipment. The failure of prior art methods to effect a satisfactory uniform bond between the prevulcanized tread strip and the tire casing has generally been due to two factors. First, deformation and shrinkage of the tire casing due to the application of pressure thereto during the bonding operation, and second, the entrapment of air between the tread strip and the tire casing.

Therefore, the principal object of the present invention relates to a novel method of uniformly bonding a prevulcanized tread strip to a tire casing.

A further object of this invention relates to a novel method of uniformly bonding a prevulcanized tread strip to a tire casing without deformation and shrinkage of the tire casing and with removal of entrapped air between the tire casing and the tread strip.

Other objects and the entire scope of the present invention will become apparent from the following detailed description and reference to the accompanying drawings. It should be understood, however, that the detailed description and specific examples while indicating preferred embodiments of the invention, are given by way of illustration only, since various changes and modifications within the spirit and scope of the invention will become apparent as the description herein progresses. Reference is now made to the accompanying drawings which form a part hereof, wherein like numerals refer to like parts throughout and in which:

FIGURE 1 is an exploded sectional view illustrating a prevulcanized tread strip positioned for assembly to a tire casing;

FIGURE 2 is a perspective view of the mounted tire casing positioned to peripherally receive a preformed vulcanized tread strip;

FIGURE 3 is a fragmentary transverse sectional view illustrating a tire casing which has been prepared and mounted for recapping;

FIGURE 4 is a cross-sectional view of the assembled unit shown in FIGURE 1 including an encircling cover in accordance with the present invention;

FIGURE 5 is a fragmentary transverse sectional view of the assembled unit shown in FIGURE 4 mounted on a rim;

FIGURE 6 is a perspective view partly in section of a pressure chamber with the assembly shown in FIGURE 5 arranged therein for vulcanization of the tread strip to the tire casing;

Figure 7:
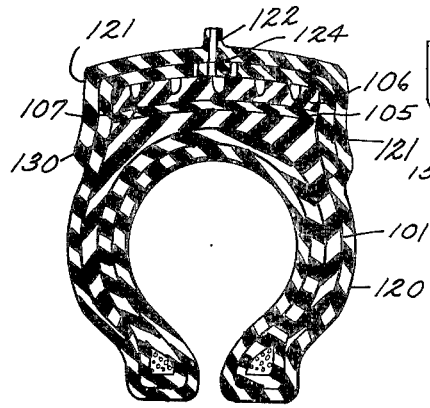
FIGURE 7 is a transverse sectional view showing a modification of my invention.
Figure 8:
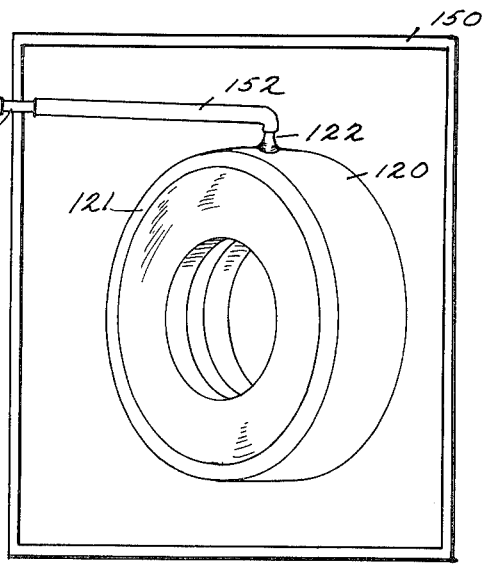
FIGURE 8 is a perspective view partly in section of a pressure chamber with the modification shown in FIGURE 7 arranged therein for vulcanizing the tread strip to the tire casing.

Referring now to the drawings in detail, the numeral 1 generally indicates a tire casing which includes the usual inner carcass 2 protected by an outer side layer 3 of rubber, and a worn or incomplete tread or crown portion 4 which has been suitably prepared by being roughened along the peripheral road engaging surface 5 to receive a strip 6 of prevulcanized and profiled retread material.

The encircling tread strip 6 may either be manually or automatically applied to the peripheral surface 5 of the tire, after which the terminal ends thereof are roughened and coated with cement and then joined together with cushion gum.

The prevulcanized tread strip may be prepared by separately molding uncured tread material in a vulcanizing press under extremely high pressure. The preformed vulcanized tread may be suitably profiled along the outer, road-engaging surface during the initial vulcanizing of the tread material and is preferably manufactured in elongated strips of various widths so that the finished tread can be subsequently applied to tire casings of different dimensions.

If desired, before the aforementioned prevulcanized and profiled tread strip 6 is applied to the tire, the crown or road engaging tread portion 5 of the tire casing 1 may first be circumferentially and radially contracted by laterally spreading the tire shoulders 10 with a conventional tire spreader 30. The tire spreader 30 includes a plurality of circumferentially spaced lugs 32 which exert an axial pressure along the inner portion of the tire shoulders 10, in a manner well known and which forms no part of the present invention. The road engaging surface 5 of the tire casing, should be roughened before the tire shoulders 10 have been laterally splayed. When the tire casing 1 is circumferentially and radially contracted by the spreader 30, the normal transverse curvature of the road engaging surface 5 will be substantially flattened, as illustrated in FIGURE 3. The use of a tire spreader is thus particularly desirable when the road engaging surface of the tire casing has a transverse curvature. Alternatively, such a transverse curvature may be removed by buffing so as to present a flattened road engaging surface. The tread strip 6 is then applied along the peripheral road engaging surface 5 while the tire casing 1 is circumferentially and radially contracted.

A layer of suitable binding material 7 is provided between the tread strip 6 and the surface 5 of the tire casing 1. The binding material may preferably comprise a self-vulcanizing binding layer of uncured cushion gum material. The binding material may be applied to either the inner surface 11 of the tread strip 6 or the surface 5 of the tire casing 1, or both prior to the application of the tread strip to the tire casing.

The assembly comprising the tire casing 1, binding layer 7 and tread strip 6 is then enclosed on the outside by an air-tight annular flexible hood or cover 20 constructed from plastic, rubber, or similar resilient material. The cover 20 should be at least flexible in the region of the tread strip. As best seen in FIGURE 4, the encircling cover 20 is preferably elastic, and includes a pair of flexible side wall members 21 which extend downwardly beyond the lateral edges 9 of the tread strip 6 over the side walls 8 of the tire casing 1 and over the tire shoulders 10 so as to enclose the same and be in resilient engagement therewith. The cover 20 is provided with at least one outlet 22 for reasons that will become readily apparent. In the event that a tire spreader is employed while applying the tread strip to the tire casing, the cover 20 may be applied to the assembly either before or after the tire spreader is removed. In any event, if a tire spreader has been employed it must be removed before the following step.

The assembly comprising the tire casing 1, the binding layer 7 and tread strip 6 all enclosed by the cover 20 is mounted on a suitable rim 40. The rim 40 includes peripheral flanges 41 and a suitable means 42 to permit inflation of the tire casing 1. As best seen in FIGURE 5, the portions of the elastic cover 20 which extend over the tire shoulders 10 will be in sealing engagement therewith and in sealing engagement with the flanges 41 of the rim 40. Thus, it is readily apparent the space intermediate the tire casing 1 and the elastic cover 20 is effectively sealed from communication with the interior of the tire casing 1. In addition, the space intermediate the tire casing 1 and the cover 20 may communicate with the surroundings only by way of outlet 22. It will be readily apparent to those skilled in the art that the seal between the cover 20 and the tire casing 1 may be established in other ways than aforementioned.

As shown in FIGURE 6, the retread assembly comprising the tire casing 1, binding layer 7 and retread strip 6, all enclosed by elastic cover 20 and mounted on rim 40 is placed in a suitable autoclave or pressure chamber 50. The chamber 50 is provided with a suitable outlet means 51 that communicates to the outside atmosphere. The outlet 51 is operatively connected to the outlet 22 of the elastic cover 20 by suitable conduit means such as tube 52. Preferably, the chamber 50 is provided with a suitable inlet means 53 which is connected to the inlet 42 of the rim 40 which communicates with the interior of the tire casing 1. Inlet means 53 is operably connected to a suitable pressure source (not shown) for inflation of the tire during its treatment in the chamber. After the assembly has been thus arranged in the chamber, the chamber is pressurized and warmed to a somewhat elevated temperature, preferably 60° C.–100° C., to provide a drying operation that will accelerate vulcanization of the binding layer. Simultaneous with the pressurization of the chamber the tire is inflated by means of inlet 42. The pressure in the tire should exceed the pressure in the chamber, a pressure differential in the range of 15–50 pounds per square inch being preferred. While the pressure in the chamber should be at least 50 pounds per square inch, a chamber pressure of 85 pounds per square inch is preferred with a pressure of 115 pounds per square inch in the tire.

Alternatively, the tire may be partially inflated prior to treatment in the chamber and subsequently inflated to the desired pressure during treatment in the chamber. In any event, it is essential that the pressure in the tire exceed the pressure in the chamber during vulcanization of the binding layer.

Since the space intermediate the tire casing 1 and the elastic cover 20 is in free communication with the atmosphere through outlet 22, conduit 52 and the chamber outlet means 51 there will be only atmospheric pressure within such space. The pressure in the chamber 50, being greater than atmospheric pressure, will press on the surface of the elastic cover 20 exposed thereto, and thus also on the surface of the tire casing 1, the tread strip 6 and the intermediate binding layer 7. Air entrapped in the binding layer 7, between the tire casing 1 and tread strip 6 will be expelled and carried off to the atmosphere by way of outlet 22. In addition, the pressure of the chamber acting through the elastic cover 20 will radially compress the inner surface 11 of the tread strip 6 against the peripheral surface 5 of the tire casing 1 so as to achieve uniform surface vulcanization of the intermediate binding layer 7. The pressure acting to press the tread strip against the tire casing will be the chamber pressure less atmospheric pressure which exists in the space between the cover and the tire. It is apparent that no deformation and shrinkage of the tire casing 1, during the vulcanization of the tread strip 6 thereto, will occur since at all times the pressure within the tire exceeds the surrounding chamber pressure. It might be noted that this embodiment is of particular utility in retreading tires such as nylon reinforced tires which tend to shrink when exposed to the somewhat elevated temperature as encountered during vulcanization.

FIGURE 7 shows a modification of my invention wherein the tire casing is not mounted on a rim and is not inflated during vulcanization of the tread strip thereto. In carrying out this modified form of my invention, a tread strip 106 is applied to the peripheral road engaging surface 105 of the tire casing 101. A layer 107 of suitable binding material is provided between the tread strip 106 and the surface 105 of the tire casing 101. Preferably, the surface 105 has been previously roughened. Thus far the procedure is essentially the same as in the first mentioned embodiment of my invention. The assembly of tire casing 101, tread strip 106 and layer of binding material 107 is then completely enclosed by an air-tight elastic cover 120 preferably constructed from plastic, rubber or similar resilient material. The cover 120 is preferably U-shaped and covers the outside as well as the inside of the assembly. The cover is preferably formed with extending edges or portions 121 which overlap each other when the elastic cover is wrapped around the assembly, as clearly shown in FIGURE 5. The elastic cover is provided with at least one outlet 122 although a plurality of outlets may be provided at various locations.

Where the outlet 122 overlies a lapped portion of the cover 120, that portion of the cover may be perforated as at 124 to facilitate the flow of entrapped air to the outlet. After the tire casing 101, binding material 107 and tread strip 106 is enclosed in the flexible cover 120 which is tightly wrapped therearound, the entire assembly is placed in a suitable autoclave or pressure chamber 150 where the outlet 122 is operably connected to a suitable conduit 152 which communicates with the atmosphere through outlet means 151 provided in chamber 150. After the assembly has been thus arranged in the chamber, the chamber is pressurized above atmospheric pressure and warmed to a somewhat elevated temperature, preferably 60° C.–100° C., to provide a drying operation that will accelerate vulcanization of the binding layer. The pressure in the chamber 150 will press on the whole surface of the elastic cover 120 and will cause the overlapping edges 121 to be held in sealed relationship. Since the space intermediate the elastic cover 120 and the tire casing 101 is in free communication with the atmosphere by means of outlet 122, air entrapped therein will be expelled to the atmosphere through conduit 152 and chamber outlet 151 due to the higher chamber pressure. In addition, the pressure of the chamber acting through the elastic cover 120 will compress the inner surface 130 of the tread strip 106 against the peripheral surface 105 of the tire casing 101 so as to achieve uniform vulcanization of the intermediate binding layer 107. Since the pressure in the chamber will press equally on all surfaces of the tire assembly, both on the outside and inside, no deformation and shrinkage of the tire will occur during vulcanization of the binding layer. Thus, as in the first mentioned embodiment of the invention a secure uniform bond is established between the tread strip and the tire casing in a most simple and economical fashion.

Figure 9:
FIGURE 9 is a transverse sectional view showing a modified tread strip for use in accordance with the present invention.

In order to facilitate the flow of air trapped between the tread strip and the road engaging surface of the tire casing the tread strip may be provided with a plurality of holes or passages 61 as best seen in FIGURE 9 wherein reference numeral 60 indicates the tread strip.

In pressurizing the pressure chamber either air, water or other suitable fluid that may be heated can be used. In the first described embodiment the tire may be inflated with air, water or other fluid which may be heated, regardless of the particular medium employed to pressurize the chamber, i.e., water, air or other fluid. It should be noted that the pressures set forth in the foregoing are merely preferred pressures and that other pressures, including pressures considerably higher than those within the aforementioned ranges may be employed, the only limitation being the practical consideration of the cost and complexity of suitable equipment.

Figures 10, 11:
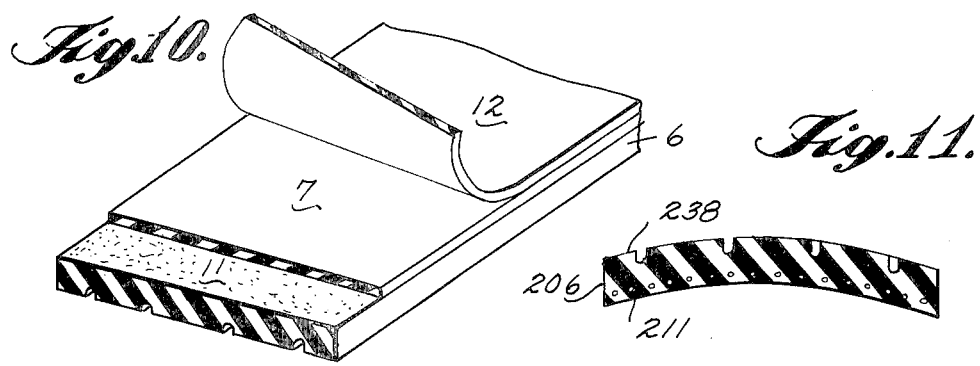
FIGURE 10 is an enlarged sectional view of a prevulcanized and profiled tread strip which may be employed to retread tires in accordance with the present invention.
FIGURE 11 is a transverse sectional view of a reinforced tread strip which has been vulcanized and profiled in a high pressure molding press.

The binding material employed in the present invention may have the same basic composition as the cushion gum generally employed for retreading tires by hot vulcanization and may be formed in thin sheets which correspond to the width of the preformed tread strip. Vulcanizing accelerators used in conjunction with such a cushion gum binding material will cause vulcanization of the binding material. Since this vulcanizing reaction takes place at normal or somewhat elevated temperatures of from between 60°C. and 100°C., it is considered to be a "cold" or "self" vulcanization reaction. As best seen in FIGURE 10, the self-vulcanizing binding layer 7 is preferably bonded to the preformed tread strip 6 by first roughening and coating the inner surface of the latter with vulcanizing accelerators. Next a thin sheet or layer 7 of uncured cushion gum is applied directly to the inner surface 11 and will become locally vulcanized to the tread strip 6 by the surface reaction between the uncured cushion gum and the vulcanizing accelerators. However, extremely desirable results have also been achieved by applying the self-vulcanizing binding layer of treated cushion gum directly to the heated tread strip immediately after it has been removed from the high pressure vulcanizing press so that adjacent contacting surfaces thereof will become bonded together without requiring the use of any cement whatsoever since the retread material itself serves as an adhesive at elevated temperatures. The outer surface of the uncured cushion gum layer is then covered by an easily removable protective layer 12 of impregnated paper, cellophane, or the like. The combined pre-vulcanized tread and self-vulcanizing binding layer of treated cushion gum may be commercially produced in the form of rolls which can be safely stored.

In applying the tread strip 6 to the tire casing 1, it is only necessary to first buff and roughen the running surface 5 of the tire casing 1 and then coat it with vulcanizing accelerators, whereupon the preformed tread strip 6 which is provided with an inner self-vulcanizing layer 7 of uncured cushion gum, can be peripherally drawn on the tire after the protective layer 12 has been removed. Alternatively, the binding layer 7 may be applied to the surface 5 of the tire casing 1 or to the inner surface 11 of the tread strip 6 at the time the latter is applied to the tire casing.

As illustrated in FIGURE 11, the prevulcanized tread strip 206, which has been molded in a vulcanizing press at extremely high pressure, may be reinforced by an embedded ply 211 of cords or metallic threads. The cord or metallic threads utilized for reinforcement of the retread material may be arranged and embedded either in a transverse or longitudinal direction throughout the preformed tread strip. Reinforcement of the tread strip in the aforementioned manner will additionally increase the resistance of a tire to severe carcass damage which normally would result from impact with external objects since the embedded plies of wire or cord threads will tend to distribute the localized stresses over a large area.

Figure 12:
FIGURE 12 is a transverse sectional view of a modified reinforced tread strip.

Alternatively, the profiled outer surface 238 of a vulcanized tread strip may be structurally reinforced by an additional ply of reinforcing cords or metallic threads 248 extending in parallel relation throughout the web portion 236 of the tread material, as best seen in FIGURE 12. The reinforcing ply 248 is preferably located within the web portion 236 to enhance resistance to abrasion and increase the load capacity of the retreaded tire. It should be noted however, that the reinforcing plies of cord or metal threads may be embedded within the prevulcanized tread strip in various combinations and arrangements to increase the service life of a tire retreaded in accordance with the disclosure of this invention.

The present invention will thus be seen to completely and effectively accomplish the objects enumerated hereinabove. By retreading a tire according to my novel invention the tread strip is uniformly and securely bonded to the tire casing without deformation and shrinkage of the tire casing and with the removal of air entrapped between the tire casing and tread strip in an extremely simple and economical fashion.

It is also to be understood that, although several preferred embodiments of the invention have been shown in the drawings and described with considerable particularity in the foregoing specification, the invention is not limited to the specific details and forms shown and described, but includes all modifications coming within the scope of the appended claims and their equivalents.

I claim:
1. A method of retreading the road engaging surface of a tire comprising the steps of forming an assembly of a tire casing, a prevulcanized tread superimposed on the peripheral road engaging surface of said tire casing, and a binding medium between said peripheral road engaging surface of said tire casing and said tread, enclosing the outside of said assembly within a flexible air-tight cover having side walls which extend over the shoulders of said tire casing, mounting said tire casing on a rim having peripheral flanges adapted to engage said shoulders, said cover side walls extending intermediate said shoulders and said flanges so as to be in sealing engagement there- with, establishing communication between the atmosphere and the space intermediate said cover and said assembly, inflating said tire casing with a fluid at a pressure greater than atmospheric pressure and simultaneously applying to the outside of said cover a fluid pressure greater than atmospheric pressure but less than the inflating pressure, whereby said cover presses against the assembly at a pressure equal to the difference between the pressure applied to said cover and atmospheric pressure, at least in the region of said tread to expel air entrapped between said peripheral road engaging surface and said tread and uniformly press said tread against said peripheral road engaging surface during bonding of said tread to said peripheral road engaging surface without deformation of said tire casing.

2. A method as set forth in claim 1 wherein the difference between the inflating pressure and the pressure applied to the outside of the cover is 15 to 50 pounds per square inch.

3. A method as set forth in claim 1 wherein said assembly is heated while the pressures are being applied.

4. A method of retreading the road engaging surface of a tire comprising the steps of forming an assembly of a tire casing, a prevulcanized tread superimposed on the peripheral road engaging surface of said tire casing, and a layer of binding material between said peripheral road engaging surface of said tire casing and said tread, enclosing the outside of said assembly within a flexible generally U-shaped air-tight cover having side walls which extend over the rim engaging shoulders of said tire casing, mounting said tire casing on a rim having peripheral flanges adapted to engage said shoulders with said cover side walls extending intermediate said shoulders and said flanges so as to be in sealing engagement therewith, placing said assembly enclosed by said cover and mounted on said rim within a pressure and heating chamber, establishing communication between the atmosphere and the space intermediate said cover and said assembly, establishing communication between the interior of said tire casing and a source of fluid pressure, applying a first fluid pressure greater than atmospheric pressure to the interior of said tire casing, applying within said chamber a second fluid pressure greater than atmospheric pressure but less than said first pressure, said second pressure pressing on the outside of said cover whereby said cover presses against the assembly at a pressure equal to the difference between the pressure applied to said cover and atmospheric pressure, at least in the region of said tread to expel air entrapped between said peripheral road engaging surface and said tread and uniformly press said tread against said peripheral road engaging surface during bonding of said tread to said peripheral road engaging surface without deformation of said tire casing and heating to complete the bonding of the tread to said tire casing.

5. A method as set forth in claim 4 wherein the difference between said first fluid pressure and said second fluid pressure is within the range of 15 to 50 pounds per square inch.

6. A method as set forth in claim 5 wherein the fluid utilized to apply said first and second pressures is heated to an elevated temperature so as to accelerate bonding of said tread to said peripheral road engaging surface of said tire casing.

7. A method as set forth in claim 6 wherein said temperature is within the range of 60° C. to 100° C.

8. A method of retreading tires comprising the steps of forming an assembly of a tire casing, a prevulcanized tread superimposed upon the outer peripheral road engaging surface of said tire casing, and a binding material between said outer peripheral road engaging surface of said tire casing and said tread, wrapping a single flexible cover sheet over said assembly so that said cover sheet engages the outer faces of said assembly and the inner face of said tire casing and so said cover sheet forms a wrapper enclosing said assembly, placing said assembly enclosed by said cover sheet within a pressure and heating chamber, establishing communication between the atmosphere and the space intermediate said cover sheet and said assembly, applying pressure greater than atmospheric pressure to the surface of said cover sheet, whereby said tire casing and said tread are uniformly pressed together from opposite sides without deforming the tire casing to expel air entrapped between said peripheral road engaging surface and said tread during bonding of said tread to said peripheral road engaging surface and heating to complete the bonding of the tread to said tire casing.

References Cited by the Examiner

UNITED STATES PATENTS

| 1,579,641 | 4/1926 | Burdette | 156—96 X |
| 2,966,936 | 1/1961 | Schelkmann | 156—96 |
| 2,976,910 | 3/1961 | Nowak | 156—96 |

FOREIGN PATENTS

| 555,690 | 9/1943 | Great Britain. |
| 746,375 | 3/1956 | Great Britain. |
| 92,699 | 6/1959 | Netherlands. |

EARL M. BERGERT, *Primary Examiner.*